Oct. 22, 1963 M. F. McGINNIS 3,107,769
REMOTELY CONTROLLED PARKING METER
Filed Sept. 5, 1961

INVENTOR.
MARIE F. McGINNIS
BY Bertha L. MacGregor
ATTORNEY

United States Patent Office 3,107,769
Patented Oct. 22, 1963

3,107,769
REMOTELY CONTROLLED PARKING METER
Marie F. McGinnis, 777 Eudora St., Denver 20, Colo.
Filed Sept. 5, 1961, Ser. No. 136,104
1 Claim. (Cl. 194—1)

This invention relates to remotely controlled parking meters. Coin operated parking meters located adjacent streets and roadways are in common use, particularly in cities and villages, for the convenience of motor vehicle operators who wish to park their vehicles on public streets for a limited time. Conventional meters now in use require the operator to insert a coin and manually to actuate a plunger or other mechanism which is part of the meter for the purpose of winding the clock mechanism and for moving an indicator to a position indicating the beginning of the allotted parking period. Clock mechanism in the meter housing gradually moves the indicator at such rate that it indicates the expiration of the allotted period when the predetermined time has passed, and then it is necessary for the operator to insert another coin and manually to actuate the plunger or other mechanism to rewind the clock mechanism and to return the indicator to a position indicating the beginning of another legal parking period.

Frequently it is inconvenient or impossible for the driver to return to his vehicle within the parking time authorized for the purpose of complying with the requirements for extending the permitted parking time. The object of my invention is to provide means enabling the driver to extend his parking period without requiring his presence at the site of the meter. This object is attained by providing dial equipped pay stations at various sites and an electrical system including a switchboard connecting the pay stations to the parking meters located within a specified area.

It is recognized that, at present, it is deemed advisable by urban authorities to limit street parking of vehicles to relatively short periods of time and to discourage successive renewals of the parking privilege by the vehicle user. However, by the use of this invention, vehicle parking in less congested areas can be encouraged, thereby relieving the heavy traffic districts of cities from street parking. For example, parking meters located near but not in the highly congested areas may be made part of the remotely controlled system of meters while those located in the heavy traffic districts may be excluded from the system. Thus a downtown worker or shopper can park his automobile at a convenient distance from the congested area and renew the parking privilege from time to time as required by depositing a coin in a nearby pay station and dialing the number of his parking meter. Dial equipped pay stations may be located near department stores, office buildings, hotels and the like where they are most likely to accommodate the vehicle drivers who have parked at a distance from the sites of their activities, that is in decentralized areas where parking space is more readily available than it is near such department stores, office buildings and other congested places.

The use of this invention is designed to decentralize vehicle parking and to provide additional revenue to urban and suburban governments, as well as to serve the motor vehicle driving public.

Figures 1, 2, 3:
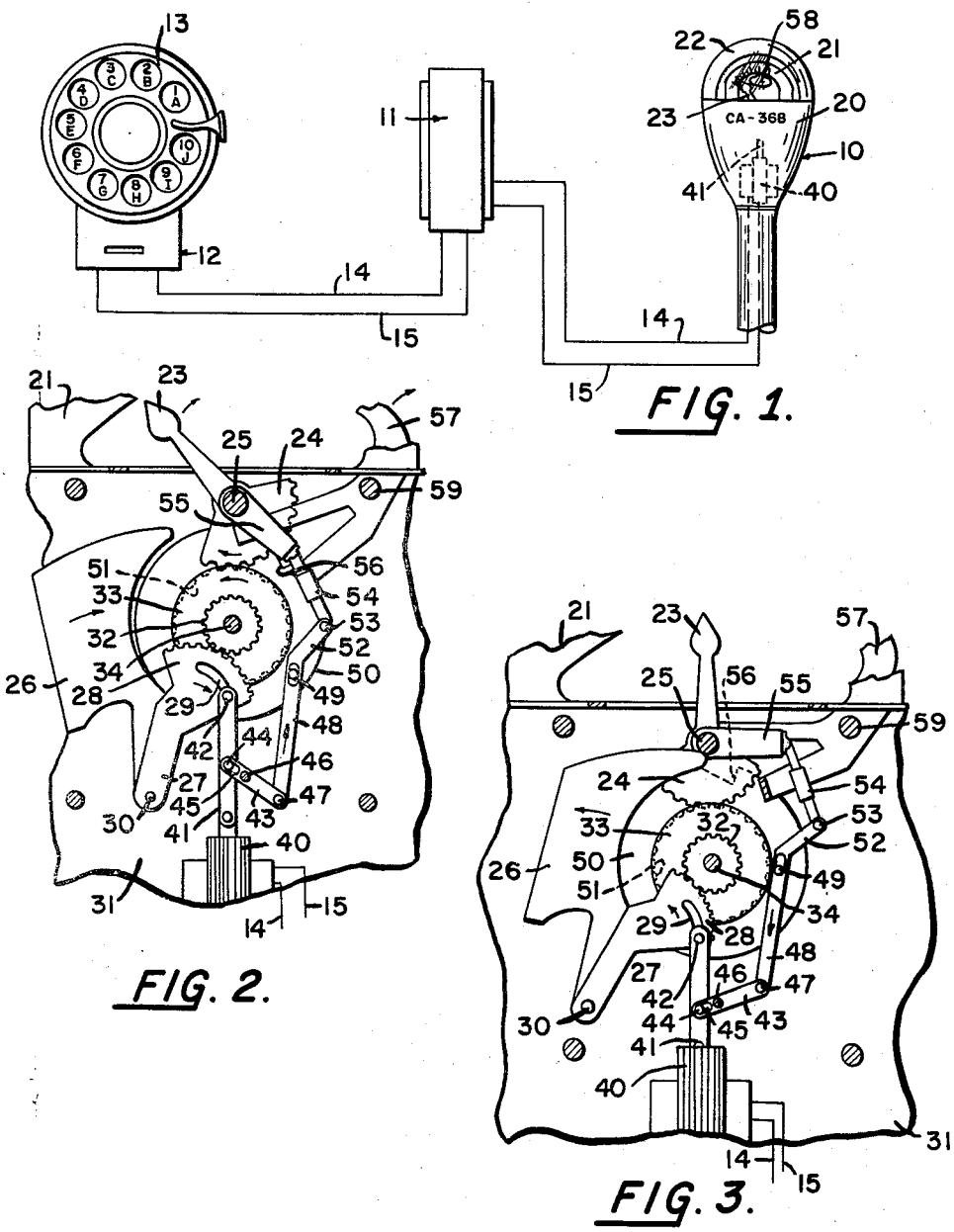
FIG. 1 is an elevational view, partly diagrammatic, of a dial equipped coin box and remotely controlled parking meter embodying my invention, electrically connected to each other through an intermediate switchboard.
FIG. 2 is an elevational view of part of the mechanism in the remotely controlled parking meter, showing the indicator and other mechanism as they appear when the parking time has expired.
FIG. 3 is a view similar to FIG. 2, but showing the indicator and other mechanism as they appear when the clock mechanism has been rewound and the indicator moved to indicate the beginning of the legal parking period.

In that embodiment of the invention shown in FIG. 1 of the drawings, a parking meter is indicated as a whole at 10, a switchboard at 11 and a coin box at 12. A dial 13 of the type employed on dial controlled telephones is mounted on the coin box 12, the dialing mechanism being operatively connected to coin actuated means in the box (not shown) which may be of the type now in use in coin telephone boxes. The dialing mechanism of a plurality of pay stations is connected to a plurality of parking meters 10 through the electrical circuits 14, 15, in which the switchboard 11 is connected. Each meter 10 will bear a designation which may be dialed, such for example, as CA–368, on an exposed part of the meter.

As heretofore explained, dial equipped pay stations such as indicated at 12, 13, may be located in congested areas and places such as department stores, hotels and the like, for the use of vehicle drivers who may have parked their vehicles at a distance from heavy traffic areas. By depositing a coin and dialing the number assigned to a particular parking meter, the vehicle driver may renew the parking privilege without returning to the site of his vehicle.

Conventional parking meters comprise a housing 20, time scale 21 visible through a transparent casing 22, and an indicator 23 which is part of a segmental toothed gear 24 pivotally mounted on a horizontal shaft 25. A manually operated coin receiving plunger 26, lever 27 and integral gear 28, slotted at 29, are connected together and pivotally mounted on stub shaft 30 fixed on supporting plate 31. When a coin is inserted in plunger 26, as shown in FIG. 2, and the plunger is manually pressed inwardly to the position shown in FIG. 3, the lever 27 and gear 28 are pivotally moved about the point 30 and the toothed gear 28 engages the pinion 32 fixed on disc 33 rotatable on shaft 34 to produce rotary motion of the disc 33 which winds a clock spring (not shown). The dropping of the coin from the plunger 26 actuates mechanism (not shown) which moves the indicator gear 24 and indicator 23 pivotally about the shaft 25 from the position shown in FIG. 2 to that shown in FIG. 3. The meter parts mentioned in this paragraph are the conventional mechanism found in meters operated by depositing coins and manually depressing the coin plungers 26 at the site of the meters. If the plunger 26 is pressed inwardly without a coin deposited therein, the slot 29 permits the lever 27 and gear 28 to be moved by the plunger without winding the clock spring or altering the position of the indicator 23.

For carrying out the purposes of my invention, that is the remote controlling of the meter to renew the legal parking period, the functions of the manually operable plunger 26 for winding the clock mechanism and of the coin actuated means which moves the indicator 23 to position indicating the beginning of a new parking period are performed by electrically energized means including a solenoid 40 connected in the circuit 14, 15. The shaft 41 actuated by the solenoid 40 is connected by pin 42 to the segmental gear 28. The shaft 41 has connected to it a lever 43 by pin 44 extending through slot 45. The lever 43 is pivotally mounted between its ends on stub shaft 46 fixed in the supporting plate 31. The opposite end of the lever 43 is pivotally connected at 47 to a link 48 connected through slot and pin 49 to the large disc 50 on shaft 34. On the front face of the large disc 50 is fixed a smaller toothed gear 51 located rearwardly of the disc 33. The link 48 has an end portion 52 extending at an angle to the major part of the link, connected at 53 to a spring loaded cylinder 54. The cylinder 54 engages the locking and unlocking lever 55 pivotally mounted on the shaft 25. The lever 55 is the means for locking the disc 50 and gear 51 fixed thereon in the position shown in FIG. 2 by engagement of the lever 55 with the shoulder 56 on disc 50.

The flag 57 which carries the "expired" warning 58 is pivotally mounted on stub shaft 59. The flag is frictionally engaged between the arms of the lever 55 which is U-shaped in cross section, so that when the lever 55 is actuated by the cylinder 54, the flag 57—58 moves with it as shown in FIG. 3.

The operation of the remotely controlled means for rewinding the clock mechanism and for resetting the indicator 23 to legal parking position shown in FIG. 3 is as follows: When a coin is dropped into the box 12, the number of the meter may be dialed, thus energizing the solenoid 40. This causes the shaft 41 to be drawn downwardly from the position of FIG. 2 to that of FIG. 3. Downward movement of the shaft 41 causes the gear 28 to move clockwise, thereby rotating pinion 32 and disc 33 which winds the clock mechanism (not shown). The same movement of the shaft 41, through lever 43 and link 48, actuates the spring loaded cylinder 54 to unlock the lever 55 from its locking engagement with shoulder 56 on disc 55, whereupon the disc 50 and gear 51 fixed thereon are rotated due to the connections between shaft 41, lever 43, link 48, and said disc 50. The rotated gear 51 engages the segmental gear 24 to which indicator 23 is connected and thus moves the indicator 23 about the shaft 25 to the position shown in FIG. 3.

Changes may be made in details of construction and arrangement of parts of the mechanism shown herein without departing from the scope of the invention as defined by the appended claim.

I claim:

A plurality of parking meters each of which is manually controllable at the site of the meter and remotely controllable at varying distances from each meter, each meter being located adjacent a vehicle parking site and comprising (a) an identifying designation visibly located on the meter,
(b) a time scale,
(c) a time indicator movable across said scale from a position indicating the beginning of a valid parking period to a position indicating the expiration of said period,
(d) timing mechanism in said meter,
(e) manually operable coin controlled means in said meter positioning said indicator to indicate the beginning of a valid parking period and activating the timing mechanism to move said indicator across said scale, and
(f) electrically controlled means in said meter positioning said indicator to indicate the beginning of a valid parking period and activating the timing mechanism to move said indicator across the scale, in combination with
(g) a plurality of coin controlled dial stations each located at a distance from said parking meters and each bearing selective designations corresponding to the identifying designations on said meters,
(h) a switchboard, and
(i) electrical circuits connecting each dial station to the switchboard and connecting the switchboard to the electrically controlled means in each meter, whereby depositing of a coin in one of said dial stations and dialing the designation identifying a parking meter places the indicator of that meter in position indicating the beginning of a valid parking period without manipulation of the meter at the site thereof.

References Cited in the file of this patent
UNITED STATES PATENTS 2,571,185 Bates ---------------- Oct. 16, 1951
2,712,125 Koch ---------------- June 28, 1955